UNITED STATES PATENT OFFICE.

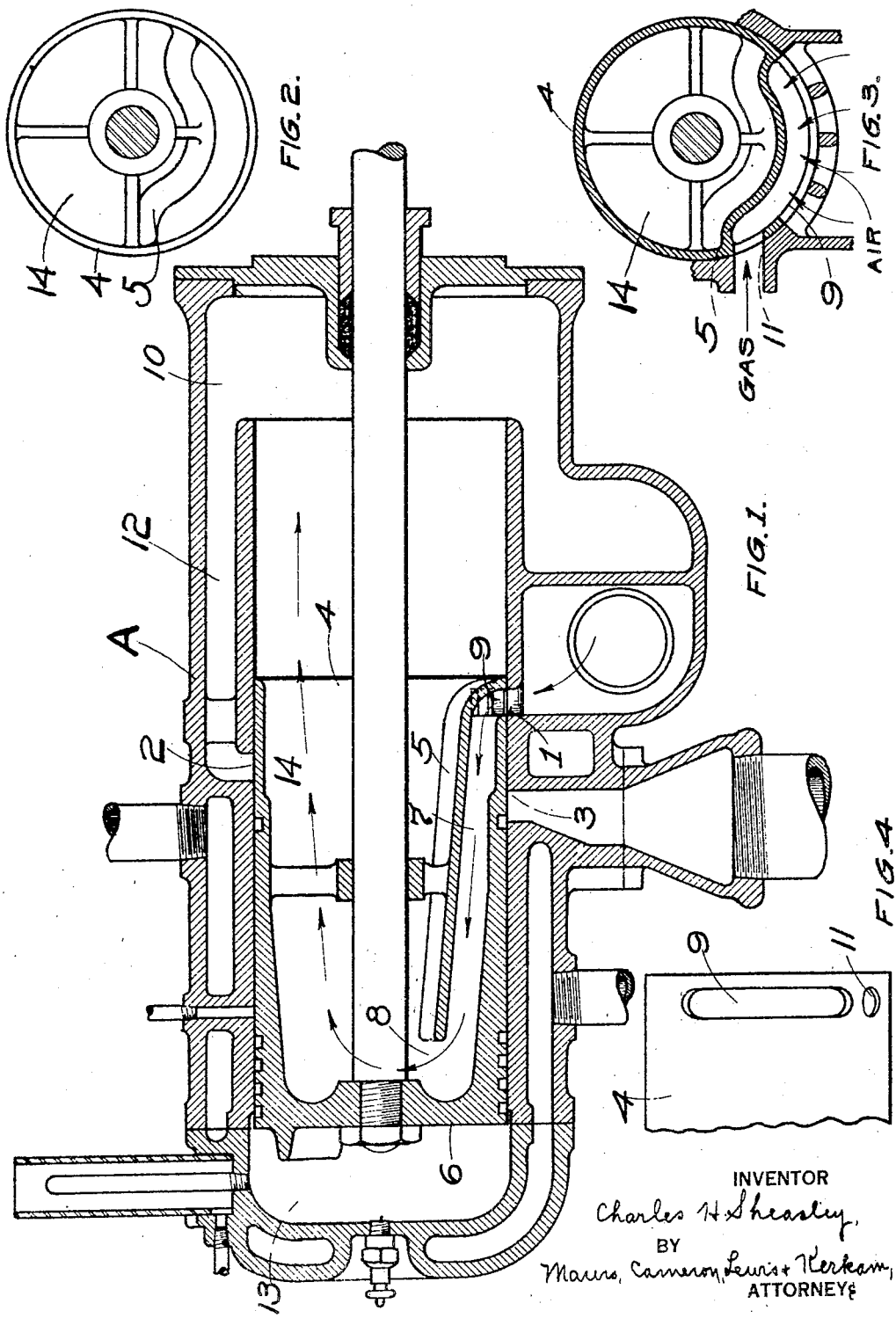

CHARLES H. SHEASLEY, OF FRANKLIN, PENNSYLVANIA, ASSIGNOR TO FRANKLIN VALVELESS ENGINE COMPANY, OF FRANKLIN, PENNSYLVANIA, A CORPORATION OF PENNSYLVANIA.

INTERNAL-COMBUSTION ENGINE.

1,409,886.    Specification of Letters Patent.    Patented Mar. 14, 1922.

Application filed December 10, 1919. Serial No. 343,970.

*To all whom it may concern:*

Be it known that I, CHARLES H. SHEASLEY, a citizen of the United States, and a resident of Franklin, Pennsylvania, have invented new and useful Improvements in Internal-Combustion Engines, which invention is fully set forth in the following specification.

This invention relates to internal combustion engines and more particularly to internal combustion engines of the two-cycle type.

The efficiency of operation of an internal combustion engine depends to a considerable extent upon the intimacy of intermixture of the fuel and air at the instant of ignition. As the intermixture of gas or vapor and air depends upon diffusion and as complete diffusion results only after the lapse of an appreciable time—while the period allowed for diffusion between the admission of the fuel and the explosion of the mixture during the normal operation of an internal combustion engine is very short, particularly in engines of the two-cycle type—it is highly desirable that diffusion be stimulated artificially. As the rate of diffusion increases with a decrease in the density of the gases or vapors, diffusions can be stimulated by increasing the temperature of the mixture. Diffusion can also be aided by abruptly changing the direction of movement of the mixture.

It is an object of this invention to provide an internal combustion engine, particularly of the two-cycle type, with means whereby the mixture is heated under such conditions as to materially facilitate intimate intermixture; the direction of movement of the mixture preferably being changed abruptly to further facilitate intermixture.

A further object of the invention is to facilitate intermixture of the constituents of the combustible mixture as heretofore pointed out while at the same time increasing the efficiency of the engine by properly cooling the piston and conserving some of the generated heat.

I am aware that many devices have been suggested for utilizing the combustible mixture or its constituents for cooling the piston of an internal combustion engine but, so far as I am aware, none of these suggested devices has been commercially successful. Moreover, they have been directed primarily to the cooling of the piston and, even as respects this object, they have been more or less defective for reasons to be pointed out.

It has been suggested frequently to transfer the combustible mixture from the pump chamber to the combustion chamber through the body of the piston. Structures of this type, however, possess the disadvantage that heat from the piston can be utilized for stimulating intermixture of the fuel and air only while they are being transferred to the combustion chamber, and insufficient time is then left to secure the advantages to be gained by heating the mixture. It is an object of this invention to pass the combustible mixture through the body of the piston under such conditions that the maximum time is afforded for taking advantage of the heat derived from the piston for effecting intermixture of the fuel and air.

It has also been suggested to pass the combustible mixture through the piston both on its way to the pump chamber and on its way to the combustion chamber. Structures of this type, however, possess the disadvantage that, whereas more heat is conserved by absorption from the piston and the piston is cooled to a lower temperature, the efficiency of the engine is actually decreased owing to the excessive expansion of the mixture, whereby the weight of the charge drawn in is decreased and the expansion following the explosion of the mixture is further decreased. It is an object of this invention to provide an internal combustion engine with means whereby the combustible mixture is drawn through the piston to absorb heat therefrom without adversely affecting the operation of the engine by excessive expansion of the entering charge.

Where the entering charge of combustible mixture is relied upon for cooling the piston, unless the charge is brought into sufficiently intimate contact with the head of the piston, there is an insufficient cooling of the piston from which results serious disadvantages, among the more important of which may be noted the difficulty in lubricating the piston owing to the disintegration of the oil and the consequent deposition of carbon, the likelihood of premature ignition of the combustible mixture as the charge is compressed, the possible injury to the spark plug by overheating, etc. Consequently, mixture-cooled pistons have not been successful so far as I am aware. It is an object of this invention to provide an internal combustion engine with means for cooling the piston by the entering charge of combustible mixture without the disadvantages and defects above discussed.

On the other hand, if the entering charge is maintained too long in contact with the hot walls of the piston the weight of the charge is decreased as its volume is increased and the force of the explosion diminished. It is an object of this invention to provide an internal combustion engine with means for cooling the piston by an entering charge of combustible mixture without materally reducing the weight of the charge.

A further object of this invention is to provide an internal combustion engine, preferably of the two-cycle type, with a piston construction for facilitating the intermixture of the fuel and air while properly cooling the piston which is simple and inexpensive. Water-cooling systems are prohibitively expensive for many types of internal combustion engines while air-cooling systems which are relatively inexpensive have been found inefficient. It is an object of this invention to provide a structure of the type in question which employs a minimum number of ports, which requires a minimum amount of machining, and which enables the piston to be cast with a minimum expenditure of labor, so as to secure a piston of low initial cost—while enabling an adequate and efficient cooling of the piston by use of the combustible mixture.

Stated broadly, the invention comprises an internal combustion engine, preferably of the two-cycle type, provided with a cylinder having a fuel and air inlet in combination with a piston having a fuel and air inlet adapted to register with the cylinder inlet on the suction stroke of the piston and provided with means whereby the admitted fluid is conducted into heat-interchanging relation with the head of the piston to increase its temperature and facilitate intermixture of the fuel and air, said piston head thereupon deflecting the admitted fluid, more or less abruptly, through the body of the piston to the usual pump chamber, whence it is transferred directly to the combustion chamber.

The invention is capable of receiving a variety of mechanical expressions, one of which is shown on the accompanying drawing, but it is to be expressly understood that the drawing is for purposes of illustration only and is not to be construed as a definition of the limits of the invention, reference being had to the appended claims for that purpose.

In said drawing:—

Fig. 1 is a longitudinal section through the cylinder and piston of an internal combustion engine embodying the present invention.

Fig. 2 is a front end elevation of said piston.

Fig. 3 is a transverse section of said piston taken through the fuel and air inlet looking from the right of Fig. 1.

Fig. 4 is a bottom plan view of a portion of the piston showing the fuel and air inlet therein.

In the form shown, A designates an internal combustion engine of the two-cycle three-port valveless type. It is to be expressly understood, however, that the invention is not limited in use to an engine of the construction illustrated as the same is of utility when employed in a wide variety of constructions.

Said cylinder is provided with a fuel and air inlet, generally designated 1, a transfer port 2 and an exhaust port 3, said fuel and air inlet and said ports all being controlled by a piston 4 which, by cooperation with said fuel and air inlet and ports, times the admission of fuel and air to the pump chamber 10, its transfer from said chamber through passage 12 to the combustion chamber 13, and the escape of the burned gases through the exhaust outlet.

In accordance with the present invention said piston is provided with a fuel and air inlet, preferably adjacent the forward end thereof, and with means extending axially of the piston from said fuel and air inlet for conducting the admitted fluid into heat-interchanging relation with the head 6 of said piston. Said means may be of any suitable construction and, in the form shown, takes the form of a fluid-directing wall or partition 5 which extends substantially parallel to the axis of the piston into proximity with said head 6. Said wall or partition provides a conduit 7 which is in communication with the chamber 14, constituting the major portion of the interior of said piston, through the gap 8 provided between the end of said partition and the inner face of the head 6. The width of said gap 8 will vary with different sizes and forms of pistons and different sizes of the fuel and air inlet. It must be sufficiently large to prevent throttling of the incoming fluid as it expands under the increase of temperature and it must be sufficiently small to insure that the charge comes into efficient heat-interchanging relation with the head of the piston—else insufficient heating of the fluid to obtain intimate intermixture, together with the consequent inefficient cooling of the head, will result. In the type of structure illustrated, a width of gap 8 twenty-five per cent in excess of the width of the admission port has been found highly efficient and satisfactory. The chamber 14, which occupies the major portion of the interior of the piston, is in open communication through the end of the piston with the pump chamber 10 and, while constituting a portion of said pump chamber, is in effect a mixing chamber into which the admitted fluid is abruptly deflected by the head of the piston.

The fuel and air inlets may be of any suitable construction or arrangement providing for the simultaneous admission of the fuel and air. The fuel and air in the form of a combustible mixture may be admitted directly through a single port, or as separate constituents of said mixture they may be admitted through one or more ports respectively or a compound port. It has been found, however, that the intimacy of intermixture is facilitated by causing the fuel and air to enter the conduit or chamber 7 by movement in angularly-related directions. In the form shown, air enters the conduit or chamber 7 through port 9 and the fuel, whether liquid or gas, enters said conduit or chamber through port 11, the axis of which is substantially at right angles to the axis of said port 9, the mixed air and fuel then passing via the conduit 7 to the interior of the piston. The arrangement shown is not essential, however, as the air may enter through two or more ports arranged on either side of the fuel port, or other arrangements may be employed to secure intermixture of the fuel and air by their movement in angularly-related directions whereby to insure against stratification of the constituents of the entering charge. It is to be expressly understood, moreover, that the invention is not limited to the separate admission of fuel and air to said conduit or chamber 7, as the preliminary mixture thereof may be effected exteriorly of said conduit or chamber and the complete intermixture secured by the present invention.

In operation, as the piston moves rearwardly to compress a charge of combustible mixture in the chamber 13, the piston fuel and air inlet is brought into registry with the cylinder inlet 1 as the piston approaches or reaches the end of its stroke. A charge of combustible mixture is drawn through the registering fuel and air inlets and flows through the conduit 7 longitudinally of the piston into heat-interchanging relation with the head of the piston. The admitted fluid, coming in contact with said head, is then deflected abruptly into the body of the piston, i. e. the mixing chamber 14, where, owing to the decrease in density arising from the increase in temperature of the charge, aided by the abrupt change in direction of movement, the constituents of the charge become intimately intermixed. The absorption of heat from the piston head also prevents overheating of the same and conserves some of the heat that would otherwise be lost. The admitted fluid then traverses the piston through mixing chamber 14 to the pump chamber 10, where it is compressed by the forward stroke of the piston. As the piston approaches or reaches the forward end of its stroke, the transfer port 2 is uncovered and the compressed charge is transferred directly from the pump chamber 10 to the combustion chamber 13, where it is further compressed by the return of the piston and finally exploded. The fluid-directing wall or partition 5 therefore constitutes a baffle which compels the entering charge to take up heat from the piston head and causes said charge to traverse the piston twice longitudinally thereof, whereby intimate intermixture of the constituents is effected by the increase in temperature and the abrupt change in the direction of movement.

It will therefore be perceived that a three-port valveless internal combustion engine has been provided which secures a more intimate intermixture of the constituents of the combustible mixture by use of heat abstracted from the piston head and aided by an abrupt change in the direction of movement while, at the same time, it increases the efficiency by conserving heat and properly cooling the piston without materially reducing the weight of the charge or causing an excessive expansion of said charge. Furthermore, a piston has been provided which is simple in construction and inexpensive to manufacture, as it is provided with but a single set of ports and its interior structure is so arranged as to enable the piston to be readily cast in its complete form.

While the embodiment of the invention as shown on the drawing has been described with considerable particularity, it is to be expressly understood that the invention is not limited thereto, as the same is capable of receiving a variety of mechanical expressions, some of which will readily suggest themselves to those skilled in the art while certain features thereof may be used without other features thereof. Reference is therefore to be had to the claims hereto appended for a definition of the limits of the invention.

What I claim is:

1. In a two-cycle internal combustion engine, the combination with a cylinder having a fuel and air inlet, a pump chamber, and a passage for transferring the fuel and air directly from said chamber to the combustion chamber, of a piston reciprocatable in said cylinder and having a fuel and air inlet adapted to register with said cylinder inlet on the suction stroke of the piston, and a fluid-directing wall in said piston extending from said fuel and air inlet into proximity with the head of said piston for directing the admitted fluid longitudinally of the piston into heat-interchanging relation with said head on its way to said pump chamber.

2. In a two-cycle internal combustion engine, the combination with a cylinder having a fuel and air inlet, a pump chamber, and a passage for transferring the fuel and air directly from said chamber to the combustion chamber, of a piston reciprocatable in said cylinder and having a fuel and air inlet adapted to register with said cylinder inlet on the suction stroke of the piston, and a fluid-directing wall in said piston extending from said fuel and air inlet into proximity with the head of said piston for directing the admitted fluid longitudinally of the piston into heat-interchanging relation with said head, the body of said piston constituting a conduit for conveying the heated fluid from said head to said pump chamber.

3. In a two-cycle internal combustion engine, the combination with a cylinder having a fuel and air inlet, a pump chamber, and a passage for transferring the fuel and air directly from said chamber to the combustion chamber, of a piston reciprocatable in said cylinder and having a fuel and air inlet adjacent its forward end adapted to register with said cylinder inlet on the suction stroke of the piston, and a fluid directing wall in said cylinder extending substantially parallel to the axis thereof from said fuel and air inlet into proximity with the head of said piston for directing the admitted fluid longitudinally of said piston into heat-interchanging relation with said head whence it returns longitudinally of the piston to said pump chamber.

4. In a two-cycle internal combustion engine, the combination with a cylinder having a fuel and air inlet, a pump chamber, and a passage for transferring the fuel and air directly from said chamber to the combustion chamber, of a piston reciprocatable in said cylinder and having a fuel and air inlet adapted to register with said cylinder inlet on the suction stroke of the piston and a conduit extending axially from said fuel and air inlet into proximity with the piston head for directing the admitted fluid into heat-interchanging relation with said head, by which it is deflected through the body of said piston to said pump chamber.

5. In a two-cycle internal combustion engine, in combination with a cylinder having a fuel and air inlet, a piston having a fuel and air inlet adapted to register with said cylinder inlet on the suction stroke of the piston, and a fluid-directing wall extending in said piston substantially parallel to the axis thereof and from said fuel and air inlet into proximity with the head of said piston for directing the admitted fluid longitudinally of the piston into heat-interchanging relation with the head of said piston and then abruptly back longitudinally through the body of the piston.

6. In a two-cycle internal combustion engine, in combination with a cylinder having a fuel and air inlet, a piston having a fuel and air inlet adapted to register with said cylinder inlet on the suction stroke of the piston, and a conduit extending axially in said piston from said fuel and air inlet into proximity with the head of said piston for conducting the admitted fluid into heat-interchanging relation with said head, by which it is deflected backwardly through the body portion of said piston.

7. In a two-cycle internal combustion engine, in combination with a cylinder having a fuel and air inlet, a piston having a fuel and air inlet adapted to register with said cylinder inlet on the suction stroke of the piston, and a partition extending axially in said piston from said fuel and air inlet into proximity with the head of said piston and dividing the interior of said piston into two passages communicating adjacent the head of said piston, whereby the admitted fluid is directed into heat-interchanging relation with the head of the piston and then backwardly through the body of the piston.

8. In a two-cycle internal combustion engine, the combination of a cylinder having a fuel and air inlet, a pump chamber, and a passage for transferring the fuel and air directly from said chamber to the combustion chamber, of a piston reciprocatable in said cylinder and having a fuel and air inlet adapted to register with said cylinder inlet on the suction stroke of the piston, and means in said piston whereby the admitted fluid is led into heat-interchanging relation with the head of said piston and then deflected abruptly backward through the body of the piston to said pump chamber.

9. In a two-cycle internal combustion engine, the combination of a cylinder having a fuel and air inlet, a pump chamber, and a passage for transferring the fuel and air directly from said chamber to the combustion chamber, of a piston reciprocatable in said cylinder and having a fuel and air inlet adjacent the forward end thereof and adapted to register with said cylinder inlet on the suction stroke of the piston, and means in said piston whereby the admitted fluid is made to traverse the piston twice in a longitudinal direction, first into heat-interchanging relation with the head of said piston and then to said pump chamber, whence it is transferred through said passage to the combustion chamber.

10. In a two-cycle internal combustion engine, in combination with a cylinder having a fuel and air inlet, a piston having a fuel and air inlet adapted to register with said cylinder inlet on the suction stroke of the piston, and means in said piston whereby the admitted fluid is made to traverse the piston longitudinally into heat-interchanging relation with the head thereof and then deflected abruptly backward longitudinally of the piston.

11. In a two-cycle internal combustion engine, in combination with a cylinder having a fuel and air inlet, a piston having a fuel and air inlet adapted to register with said cylinder inlet on the suction stroke of the piston, and a baffle in said piston whereby the admitted mixture is made to take up heat from the head of the piston and its direction of movement abruptly changed to intimately intermix the fuel and air.

12. In a two-cycle internal combustion engine, in combination with a cylinder having angularly related fuel and air admission ports, a pump chamber, a piston having admission ports adapted to register with said cylinder ports and admit charges of fuel and air moving in angularly-related directions whereby the air and fuel are mixed, and means in said piston whereby the admitted mixture on its way to the pump chamber is made to take up heat from the head of the piston and its direction of movement abruptly changed to intimately intermix the fuel and air.

13. In a two-cycle internal combustion engine, in combination with a cylinder having a fuel and air inlet, a piston having a fuel and air inlet adapted to register with said cylinder inlet on the suction stroke of the piston, the major portion of the interior of said piston providing a mixing chamber, and means in said piston for conducting the combustible mixture into heat-interchanging relation with the head of said piston to take up heat therefrom, said mixture being thereupon deflected by said head into said mixing chamber.

14. A two-cycle valveless internal combustion engine, comprising a cylinder having a fuel and air inlet, an exhaust port and a transfer port all controlled solely by the piston, a hollow piston forming a mixing chamber, a pump chamber in said cylinder in open communication with said mixing chamber, and a conduit connecting said fuel and air inlet with the rearward end of said mixing chamber on the suction stroke of the piston.

In testimony whereof I have signed this specification.

CHARLES H. SHEASLEY.